United States Patent
Ojima (10) Patent No.: US 10,707,508 B2
(45) Date of Patent: Jul. 7, 2020

(54) FUEL CELL SYSTEM

(71) Applicant: HONDA MOTOR CO., LTD., Tokyo (JP)

(72) Inventor: Kuniaki Ojima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 177 days.

(21) Appl. No.: 15/593,330

(22) Filed: May 12, 2017

(65) Prior Publication Data

US 2017/0352902 A1  Dec. 7, 2017

(30) Foreign Application Priority Data

Jun. 3, 2016 (JP) ................................ 2016-111654

(51) Int. Cl.

| | |
|---|---|
| H01M 8/04746 | (2016.01) |
| H02J 3/38 | (2006.01) |
| H02J 7/00 | (2006.01) |
| H01M 8/04089 | (2016.01) |
| H01M 8/04302 | (2016.01) |

(Continued)

(52) U.S. Cl.

CPC ........ *H01M 8/04753* (2013.01); *G05B 15/02* (2013.01); *H01M 8/04089* (2013.01); *H01M 8/04201* (2013.01); *H01M 8/04302* (2016.02); *H01M 8/04686* (2013.01); *H01M 16/006* (2013.01); *H02J 3/387* (2013.01); *H02J 7/007* (2013.01); *H02J 7/0029* (2013.01); *H02J 7/0063* (2013.01); *H02J 7/0077* (2013.01); *H01M 2008/1095* (2013.01);

(Continued)

(58) Field of Classification Search

CPC ......... H01M 8/04753; H01M 2250/20; H01M 8/04089; H01M 16/006; H01M 8/04302; H01M 8/04201; H01M 8/04686; H01M 2008/1095; G05B 15/02; Y02T 90/32; H02J 2007/0067; H02J 2007/004; H02J 7/0063; H02J 3/387; H02J 7/0077; H02J 7/0029; H02J 7/007

See application file for complete search history.

(56) References Cited

U.S. PATENT DOCUMENTS

2002/0039674 A1*  4/2002  Suzuki ............... H01M 8/04119
429/414

FOREIGN PATENT DOCUMENTS

| | | |
|---|---|---|
| JP | 2008-258072 | 10/2008 |
| JP | 2009-238457 | 10/2009 |
| WO | WO 2011/013213 | 2/2011 |

OTHER PUBLICATIONS

Japanese Office Action for corresponding JP Application No. 2016-111654, dated Dec. 26, 2017 (w/ English machine translation).

* cited by examiner

*Primary Examiner* — Cynthia K Walls
(74) *Attorney, Agent, or Firm* — Mori & Ward, LLP (57) ABSTRACT

A fuel cell system includes a battery, a fuel cell, an air pump, and a processor. The battery stores electric power. The fuel cell supplies electric power to the battery. The air pump is driven with the electric power supplied from the battery to supply air to the fuel cell. The processor, when starting the fuel cell system, is configured to compare an amount of the electric power stored in the battery with a threshold electric power. If the amount of the electric power is higher than or equal to the threshold electric power, the air pump is driven. If the amount of the electric power is lower than the threshold electric power, the air pump is prohibited to drive.

13 Claims, 9 Drawing Sheets

(51) Int. Cl.
  *G05B 15/02* (2006.01)
  *H01M 8/04082* (2016.01)
  *H01M 8/04664* (2016.01)
  *H01M 16/00* (2006.01)
  *H01M 8/1018* (2016.01)
(52) U.S. Cl.
  CPC ...... *H01M 2250/20* (2013.01); *H02J 7/00306* (2020.01); *H02J 2007/0067* (2013.01); *Y02T 90/32* (2013.01)

FUEL CELL SYSTEM

CROSS-REFERENCE TO RELATED APPLICATIONS

The present application claims priority under 35 U.S.C. § 119 to Japanese Patent Application No. 2016-111654, filed Jun. 3, 2016, entitled "Fuel Cell System." The contents of this application are incorporated herein by reference in their entirety.

BACKGROUND

1. Field

The present disclosure relates to a fuel cell system.

2. Description of the Related Art

When starting to activate, a fuel cell system of a fuel cell vehicle supplies power to auxiliaries such as an air compressor (air pump device) from a battery to activate the auxiliaries and thereafter proceeds to power generation of a fuel cell (for example, see International Publication No. 2011/013213). For this reason, when terminating operation, the fuel cell vehicle normally stops operation with an amount of power necessary for multiple times of activation being left in the battery.

SUMMARY

According to one aspect of the present invention, a fuel cell system includes a fuel cell, a battery device, an air pump device, and a control unit. The air pump device is configured to start driving with power supplied from the battery device to supply air to the fuel cell. The control unit is configured to control the drive of the air pump device based on information related to an amount of power acquired from the battery device. At the time of activation, the control unit compares an acquired value obtained from the information related to an amount of power and at least one threshold value held by the control unit with each other. The control unit causes the air pump device to drive when the acquired value is higher than or equal to the threshold value. The control unit does not cause the air pump device to drive when the acquired value is lower than the threshold value.

According to another aspect of the present invention, a fuel cell system includes a battery, a fuel cell, an air pump, and a processor. The battery stores electric power. The fuel cell supplies electric power to the battery. The air pump is driven with the electric power supplied from the battery to supply air to the fuel cell. The processor, when starting the fuel cell system, is configured to compare an amount of the electric power stored in the battery with a threshold electric power. If the amount of the electric power is higher than or equal to the threshold electric power, the air pump is driven. If the amount of the electric power is lower than the threshold electric power, the air pump is prohibited to drive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, preferred embodiments of the fuel cell system according to the present disclosure are described in detail with reference to the accompanying drawings.

A fuel cell system 10 according to one aspect of the present disclosure is mounted, for example, on a fuel cell vehicle to supply power to a load such as a driving source. The fuel cell system 10 is not limited to the on-vehicle usage, and may be applied to various usages such as a stationary device by appropriate modification.

Figure 1:
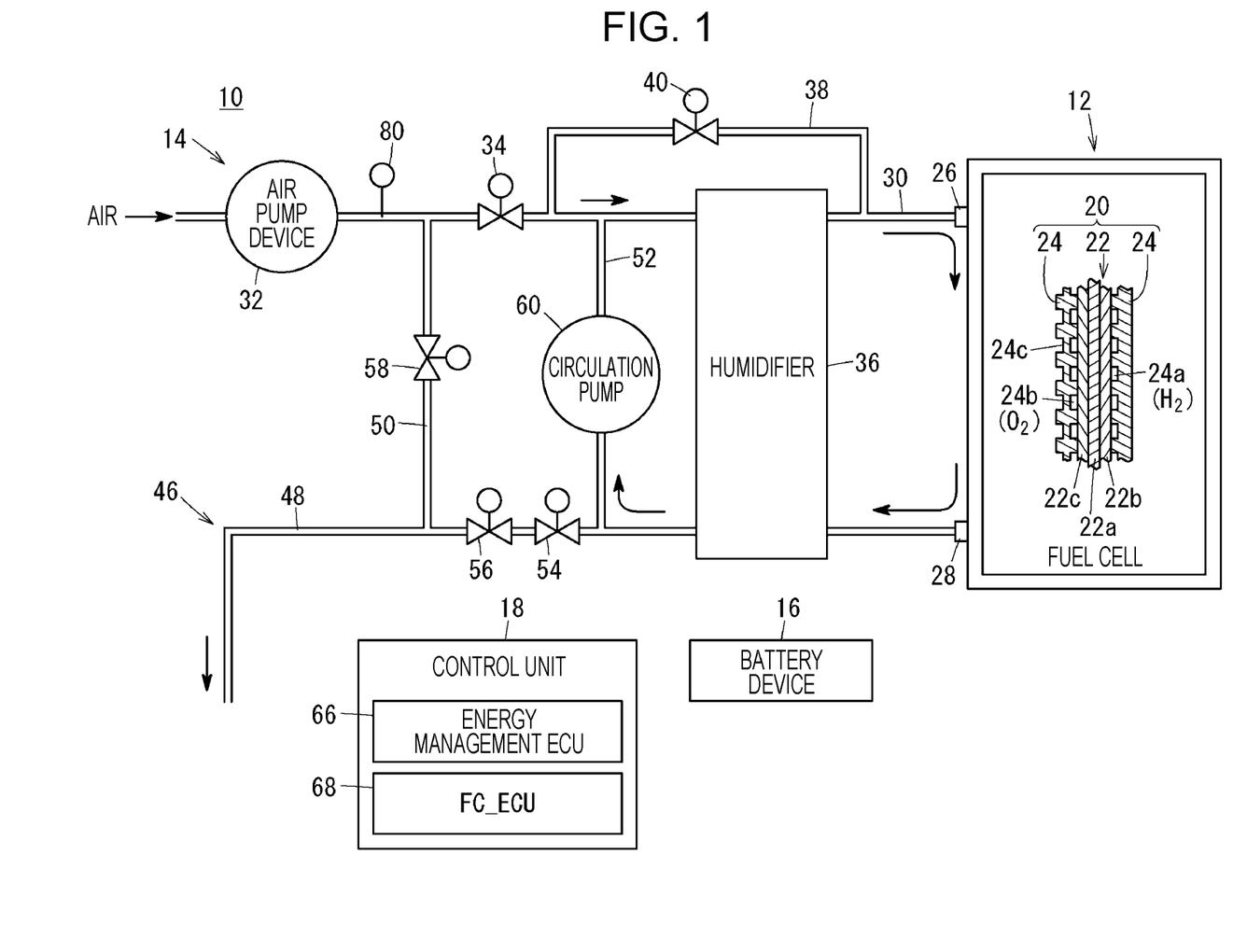
FIG. 1 is an illustrative diagram indicating a coupled state of a fuel cell and an oxidant gas supply unit of a fuel cell system according to one embodiment of the present disclosure.

As illustrated in FIG. 1, the fuel cell system 10 includes a fuel cell 12 (fuel-cell stack), an oxidant gas supply device 14 that is coupled with the fuel cell 12 and configured to supply air as oxidant gas, a battery device 16 configured to store energy, and a control unit 18 as a system control device. The fuel cell system 10 also includes, as components not illustrated, a fuel gas supply device configured to supply hydrogen gas as a fuel gas, a cooling medium supply device configured to supply a cooling medium, and so on.

The fuel cell 12 includes a plurality of power generation cells 20 stacked in the horizontal direction or in the vertical direction therein, and generates power based on chemical reactions between hydrogen gas supplied from the fuel gas supply device and air supplied from the oxidant gas supply device 14. Each of the power generation cells 20 includes an electrolyte film and electrode structure 22 and a pair of separators 24 that hold the electrolyte film and electrode structure 22.

The electrolyte film and electrode structure 22 includes, for example, a solid polymer electrolyte membrane 22a (PEM) that is a moisture-containing thin membrane of perfluorosulfonic acid, an anode electrode 22b configured to hold the solid polymer electrolyte membrane 22a, and a cathode electrode 22c. A fluorine based electrolyte and a HC based electrolyte are used for the solid polymer electrolyte membrane 22a.

The pair of separators 24 form, in conjunction with the electrolyte film and electrode structure 22, a hydrogen gas flow passage 24a for supplying hydrogen gas to the anode electrode 22b and an air flow passage 24b for supplying air to the cathode electrode 22c, respectively. A cooling medium flow passage 24c configured to communicate the cooling medium is provided between separators 24 that adjoin to each other as a result of stacking of power generation cells 20.

The fuel cell 12 includes an air inlet 26 and an air outlet 28. The air inlet 26 extends through respective power generation cells 20 in the stacking direction and communicates with a supply side of the air flow passage 24b. The air outlet 28 extends through respective power generation cells 20 in the stacking direction and communicates with a discharge side of the air flow passage 24b. Although not illustrated, the fuel cell 12 includes a hydrogen gas inlet and a hydrogen gas outlet both of which communicate the fuel gas supply device and hydrogen gas flow passage 24a with each other, and a cooling medium inlet and a cooling medium outlet both of which communicate the cooling medium supply device and cooling medium flow passage 24c with each other.

The oxidant gas supply device 14 includes an air supply passage 30 configured to communicate with the air inlet 26 of the fuel cell 12 to supply air to the fuel cell 12, and an air pump device 32 provided upstream of the air supply passage 30. The air supply passage 30 includes a supply side switching valve 34 and a humidifier 36 downstream of the air pump device 32, and is coupled with a bypass supply passage 38 across the humidifier 36. The bypass supply passage 38 is provided with a bypass on-off valve 40.

Figure 2:
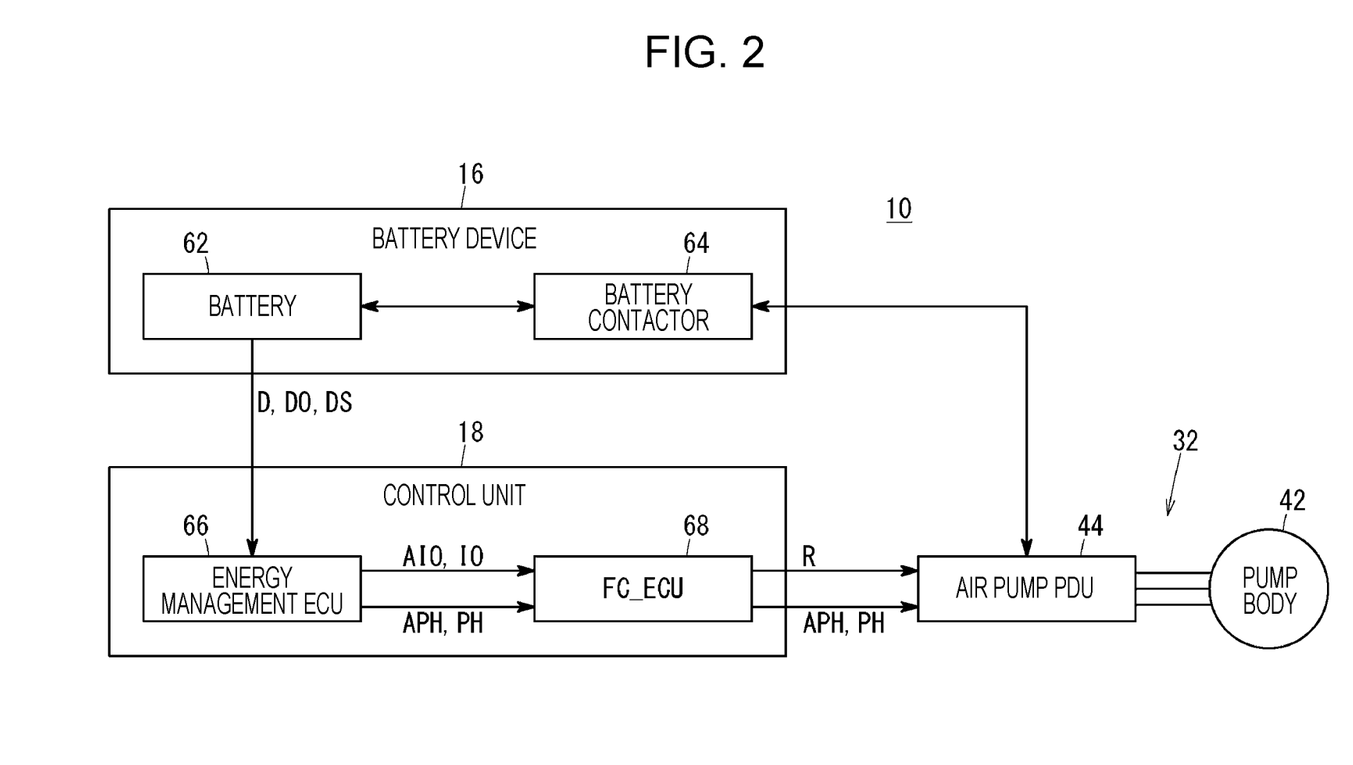
FIG. 2 is a block diagram indicating a relationship among a battery device, an air pump device, and a control unit during control of the fuel cell system illustrated in FIG. 1.

The air pump device 32 is configured to compress external air (atmospheric air) to the downstream of the air supply passage 30. The air pump device 32 includes, as illustrated in FIG. 2, a pump body 42 configured to supply air by rotation of an internal motor, and an air pump power distribution unit 44 (hereinafter referred to as an air pump PDU 44) coupled to the fuel cell 12 and battery device 16 and configured to receive power for driving the pump body 42. The air pump PDU 44 includes a three-phase bridge type inverter and is configured to convert DC voltage of the fuel cell 12 and the battery device 16 to AC voltage and control the pump body 42 under the control of the control unit 18.

Referring back to FIG. 1, the oxidant gas supply device 14 couples an air discharge mechanism 46 configured to remove discharge air (air used by the cathode electrode 22c) supplied to the fuel cell 12 to the air outlet 28 of the fuel cell 12. The air discharge mechanism 46 includes an air discharge passage 48, a bypass flow passage 50, and an air circulation passage 52.

The air discharge passage 48 extends from the air outlet 28 through the inside of the humidifier 36. The humidifier 36 exchanges moisture and heat between supply air of the air supply passage 30 and discharge air of the air discharge passage 48. A discharge side switching valve 54 and a back pressure valve 56 are provided downstream of the humidifier 36 of the air discharge passage 48, and a diluting section (not illustrated) for discharging discharge air to the outside is provided further downstream thereof.

The bypass flow passage 50 communicates between the air supply passage 30 and air discharge passage 48, with one end thereof coupled to the upstream side of the supply side switching valve 34 and the other end thereof coupled to the downstream side of the discharge side switching valve 54 and back pressure valve 56. A BP flow regulating valve 58 for regulating the flow rate of air flowing inside the bypass flow passage 50 is provided at the middle of the bypass flow passage 50. The air circulation passage 52 communicates between the air supply passage 30 and air discharge passage 48, with one end thereof coupled to the downstream side of the supply side switching valve 34 and the other end thereof coupled to the upstream side of the discharge side switching valve 54. The air circulation passage 52 is provided with a circulation pump 60 configured to circulate discharge air discharged into the air discharge passage 48 to the air supply passage 30 through the air circulation passage 52.

The battery device 16 includes a battery 62 and a battery contactor 64 as illustrated in FIG. 2 and is configured as a device capable of charging and discharging high voltage. The battery 62 is configured to supply power to respective components prior to power generation of the fuel cell 12 and assist output of the fuel cell 12 when driving a fuel cell vehicle. The battery 62 is also configured to store a power generated by the fuel cell 12 and a power regenerated from a load (for example, motor in a deceleration state). Further, the battery 62 includes a battery information processing unit (battery ECU) configured to notify the charge state and discharge limit to the control unit 18.

The battery contactor 64 is provided between the battery 62 and a load (including various auxiliaries of the fuel cell system 10) of the fuel cell vehicle or the fuel cell 12. The battery contactor 64 is configured to switch connection and disconnection between the battery 62 and a load or between the battery 62 and the fuel cell 12.

The control unit 18 of the fuel cell system 10 is configured to control drive of auxiliaries (such as air pump device 32, humidifier 36, circulation pump 60, hydrogen pump (not illustrated), water pump, and injector) to generate power of the fuel cell 12. The control unit 18 according to the present embodiment is also configured to supply power to respective loads of the fuel cell vehicle by controlling a power generated in the fuel cell 12 and a power charged in the battery 62.

Specifically, the control unit 18 includes an energy management electronic control unit (ECU) 66 and a fuel cell ECU 68 (hereinafter referred to as FC_ECU 68). A computer (including a microcomputer) including an I/O interface, a processor and a memory (not illustrated) is applied as the energy management ECU 66 and the FC_ECU 68. Function of the control unit 18, which is shared by a plurality of ECUs in the present embodiment, may be formed by one ECU.

As illustrated in FIG. 2, the energy management ECU 66 is coupled to the battery 62 (battery ECU) and FC_ECU 68 in a communicable manner and is further coupled to other ECUs and sensors (not illustrated) in a communicable manner. The energy management ECU 66 is configured to recognize the state of the fuel cell vehicle based on information of ECUs and sensors and thereby monitor energy used in the fuel cell vehicle. The energy management ECU 66 is also configured to set distribution amount, supply amount, upper limit, and so on of the current for loads of the fuel cell vehicle based on information from the fuel cell 12 and battery 62.

Meanwhile, the FC_ECU 68 is coupled to the energy management ECU 66 in a communicable manner and also coupled to auxiliaries (such as air pump PDU 44 illustrated in FIG. 2) of the fuel cell system 10 in a communicable manner. The FC_ECU 68 is configured to receive a current command value and a power upper limit value of components of the fuel cell system 10 set by the energy management ECU 66 and cause the fuel cell system 10 to drive based on information transmitted from the auxiliaries.

For example, when driving the air pump device 32, the FC_ECU 68 sets motor revolution (hereinafter referred to as air pump revolution R) of the pump body 42 based on a current command value for the air pump device 32 and transmits to the air pump PDU 44. Thus, the air pump device 32 is driven with a power supplied from the battery 62 to the air pump PDU 44 based on the air pump revolution R. The FC_ECU 68 switches drive or non-drive of the air pump device 32 by controlling a revolution command for the air pump device 32. Alternatively, connection and disconnection between the battery 62 and air pump PDU 44 may be switched by sending a command from the FC_ECU 68 or battery ECU to the battery contactor 64.

The control unit 18 of the fuel cell system 10 according to the present embodiment is configured to control drive of the air pump device 32 based on information of an amount of power acquired from the battery device 16. Hereinafter, control (control method of the air pump device 32) by the control unit 18 is described in detail.

Figure 3:
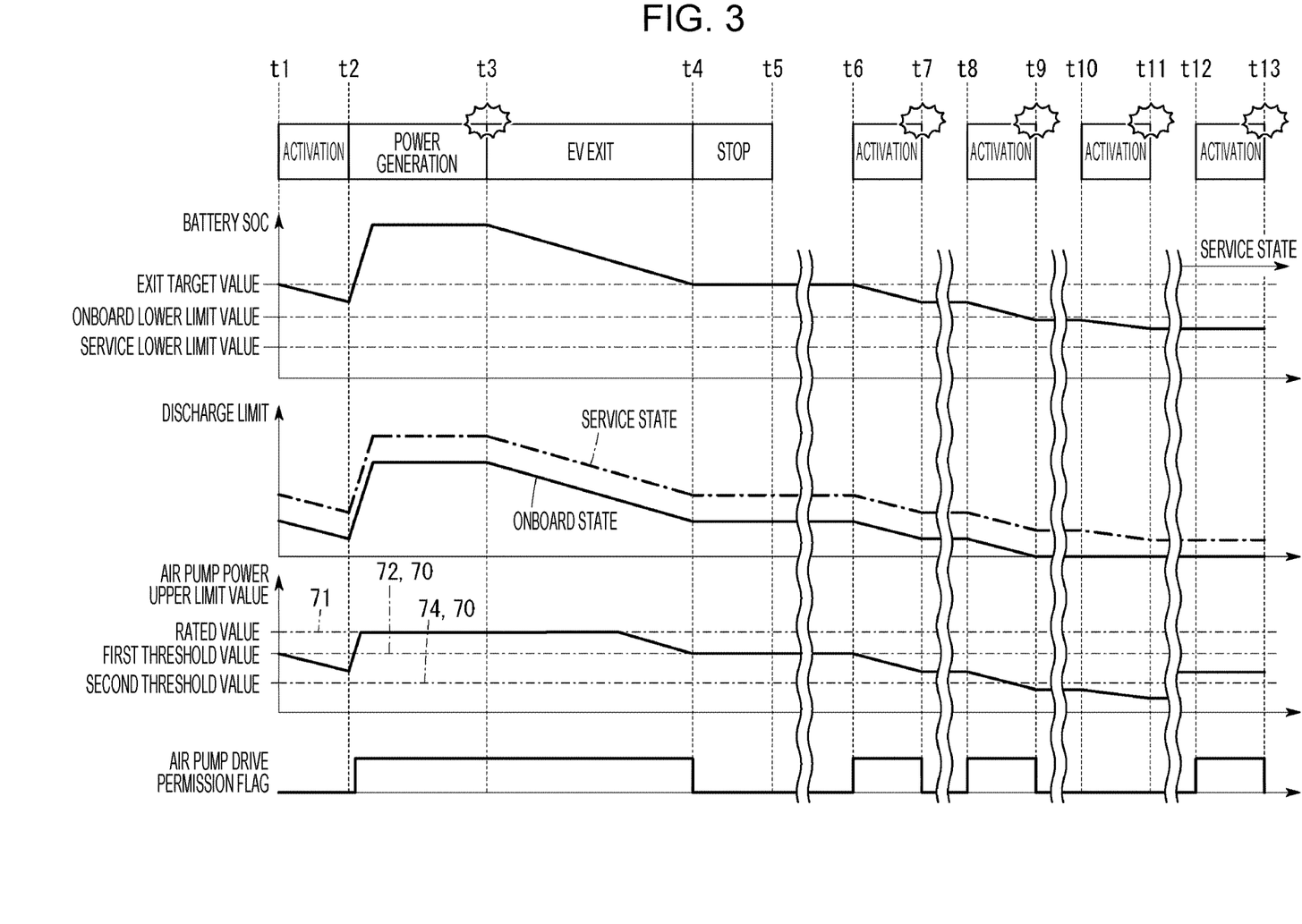
FIG. 3 is a time chart illustrating fluctuations of an SOC, a discharge limit and an air pump power upper limit value.

As illustrated in FIG. 3, the battery 62 of the fuel cell system 10 undergoes fluctuation of the state of charge (SOC) being a ratio of the remaining charge amount relative to the charge capacity depending on operation of the fuel cell vehicle. For example, the battery 62 supplies power to a load including the air pump device 32 when the fuel cell vehicle starts activation by turning ignition ON (IGON) but in a state where power is not generated by the fuel cell 12 (see t1 to t2 in FIG. 3). Thus, the SOC drops. Reversely, after power is generated by the fuel cell 12 (see t2 to t3 in FIG. 3), the battery 12 is charged with a power supplied from the fuel cell 12 or a power regenerated by a load, and thereby the SOC increases.

The battery device 16 sets a discharge limit D that is an upper limit value of output current of the battery 62, and supplies power to respective loads. The discharge limit D is set so as to be approximately proportional to the SOC of the battery 62. Further, in the battery device 16, a discharge limit DS (see a dashed line in FIG. 3) in the service state of the fuel cell vehicle such as a maintenance work is set higher by a predetermined value or by a predetermined ratio than a discharge limit DO (see a solid line in FIG. 3) in the normal state (hereinafter referred to as an onboard state) of the fuel cell vehicle such as when driven by user. Therefore, even if power is not supplied to a load due to a low SOC in the onboard state, power may be supplied to the load from the battery 62 in the service state.

Then, as illustrated in FIG. 2, the control unit 18 (energy management ECU 66) receives information of the discharge limit D from the battery device 16, and calculates a current command value IO and a power upper limit value PH (acquired value) for respective loads of the fuel cell vehicle based on the discharge limit D.

An air pump power upper limit value APH among the power upper limit value PH corresponds to an upper limit value of the power distributed to the air pump device 32 within the acquired discharge limit D. With power distribution priority information based on the load type, the energy management ECU 66 allocates the current command value IO and the power upper limit value PH in the order of descending priorities and sets an air pump current command value AIO and an air pump power upper limit value APH as well.

For example, the priorities are classified to a first group for which power is always secured, a second group for which power is secured as quickly as possible, and a third group for which power is supplied or power supply is stopped. As an example, the first group includes systems related to traveling and safety of the fuel cell vehicle and other ECUs; the second group includes components necessary for power generation such as the air pump of the fuel cell system 10 or a system (cooling system) performing a defroster function; and the third group includes external electrical components such as vehicle air-conditioning control, lighting or car navigation devices.

As illustrated in FIG. 3, the energy management ECU 66 has a rated value 71 corresponding to a function of the air pump device 32. When setting the air pump power upper limit value APH, the energy management ECU 66 sets an air pump power upper limit value APH matching the rated value 71 if the discharge limit D is sufficiently high (see t2 to t3 in FIG. 3). When the discharge limit D becomes low, the energy management ECU 66 distributes power to auxiliaries having high priority and thereafter sets the air pump power upper limit value APH.

As illustrated in FIG. 2, the air pump power upper limit value APH calculated by the energy management ECU 66 is transmitted to the FC_ECU 68, and the FC_ECU 68 drives the air pump device 32 within a range not exceeding the air pump power upper limit value APH. In other words, it can be said that the FC_ECU 68 has a function of controlling drive of the air pump based on information of the amount of power of the battery device 16. In particular, in the present embodiment, the battery 16 is configured to set the discharge limit D from the SOC of the battery 62, the energy management ECU 66 is configured to set the air pump power upper limit value APH from the discharge limit D, and the FC_ECU 68 is configured to determine drive or non-drive of the air pump device 32 based on the air pump power upper limit value APH. Thus, noise (such as power supply to other auxiliaries) contained in the SOC of the battery 62 is reduced. The control unit 18 may determine drive or non-drive of the air pump device 32 based on the SOC and discharge limit D.

More specifically, as illustrated in FIG. 3, the SOC of the battery 62 may define the state of the battery 62 with some threshold values (exit target value, onboard lower limit value, service lower limit value). The "exit target value" used herein is a target value of the SOC in the exit state to ensure long life of the battery 62 when ending (exiting) operation of the fuel cell system 10. For example, when power generation of the fuel cell 12 stops due to a failure, the battery device 16 temporarily supplies power of the battery 62 to respective loads up to the exit target value (see t3 to t4 in FIG. 3). After reaching the exit target value, drive of the fuel cell vehicle is stopped, and the fuel cell vehicle is put in the standby state (see t4 to t5 and t5 to t6 in FIG. 3).

The "onboard lower limit value" is a limit value of the SOC necessary to drive the fuel cell vehicle in the onboard state. When the SOC is higher to some extent than the onboard lower limit value, power may be supplied from the battery 62 to respective loads of the fuel cell vehicle in a stable manner. Also, for example, when the SOC is close to the onboard lower limit value in the onboard state, the fuel cell system 10 may implement continuous high load operation of the fuel cell 12 to charge the battery 62 from the fuel cell 12 such that the SOC becomes higher than the onboard lower limit value.

Further, the "service lower limit value" is a limit value of the SOC necessary to provide minimum required power generation amount in the service state. Therefore, the service lower limit value is set lower than the onboard lower limit value. The service lower limit value is used to determine power in the service state to increase a discharge limit DS of the battery 62. In a case where the SOC of the battery 62 becomes lower than the service lower limit value, power is no longer supplied from the battery 62 to respective loads of the fuel cell vehicle, and battery replacement is required.

The discharge limit D of the battery 62 is set, for example, so as to correspond to the onboard lower limit value and service lower limit value. More specifically, in the stage where the SOC is lower than the onboard lower limit value (see t9, t10, and t11 in FIG. 3), a discharge limit DO in the onboard state becomes 0. On the other hand, when servicing is selected by the user, the discharge limit D shifts to the discharge limit DS of the service state as indicated by t12 and t13 in FIG. 3. Namely, although the SOC is lower than the onboard lower limit value and thereby the discharge limit DO is 0 in the onboard state, the discharge limit DS becomes higher than 0 in the service state and discharge from the battery 62 becomes possible. Thus, in the service state, power may be supplied to respective loads of the fuel cell system 10.

The energy management ECU 66 calculates the air pump power upper limit value APH based on the discharge limit D, and the FC_ECU 68 compares the air pump power upper limit value APH and a threshold value 70 being retained with each other to determine whether or not to cause the air pump device 32 to drive. In particular, to ensure high degree of the determination, the control unit 18 recognizes the drive state (power generation or scavenging) of the air pump device 32 and allocates the calculated air pump power upper limit value APH to the power upper limit status further divided to four stages, as illustrated in FIGS. 4A and 4B.

Figure 4A:
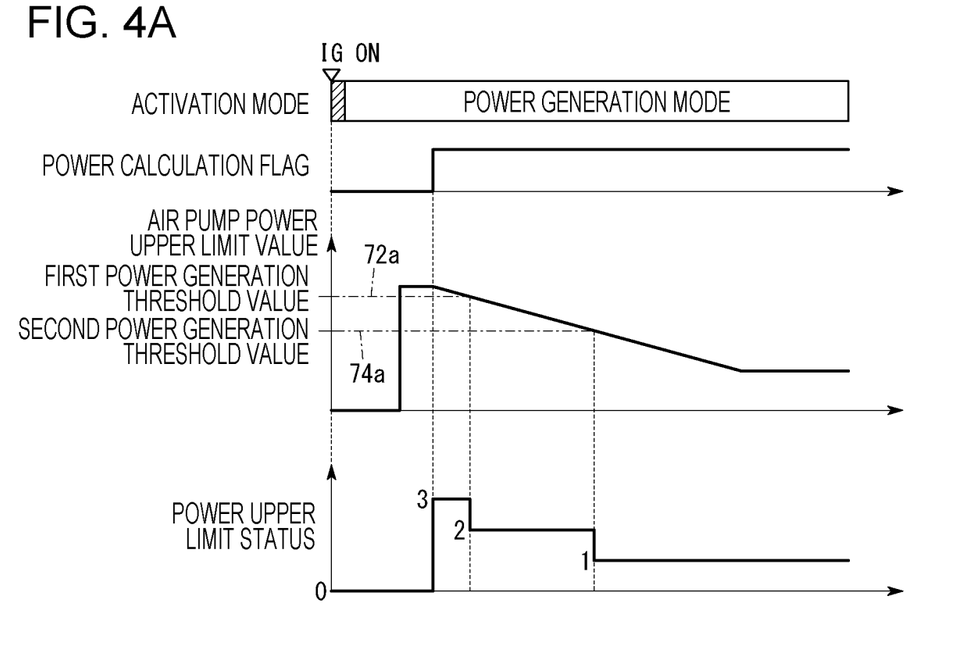
FIG. 4A is a graph illustrating a setting of a power upper limit status in a power generation mode of the air pump device.

The power generation mode illustrated in FIG. 4A is a control to supply compressed air as the oxidant gas to the fuel cell 12 when controlling the fuel cell system 10. The power generation mode is implemented when power generation request is transmitted from the energy management ECU 66 to the fuel cell 12 and a high voltage use permission command is transmitted from the energy management ECU 66. On the other hand, the scavenging mode illustrated in FIG. 4B is a control to cause the pump body 42 to rotate, for example, at a rotation speed lower than in the power generation mode in order to discharge the oxidant gas and moisture remaining inside the air flow passage 24b of the fuel cell 12. The scavenging mode is implemented when power generation request is not transmitted from the energy management ECU 66 to the fuel cell 12, and a high voltage use permission command is transmitted.

The four stages of the power upper limit status are set by allocating a numeric value out of 0, 1, 2, and 3 to the air pump power upper limit value APH. The numeric value 0 used herein indicates a state before the status is determined based on the air pump power upper limit value APH. The numeric value 1 indicates an air pump power upper limit value APH with which the air pump device 32 cannot be activated. The numeric value 2 indicates an air pump power upper limit value APH with which the air pump device 32 may not be activated. The numeric value 3 indicates an air pump power upper limit value APH with which the air pump device 32 may be activated unless the air pump device 32 is in failure.

Figure 4B:
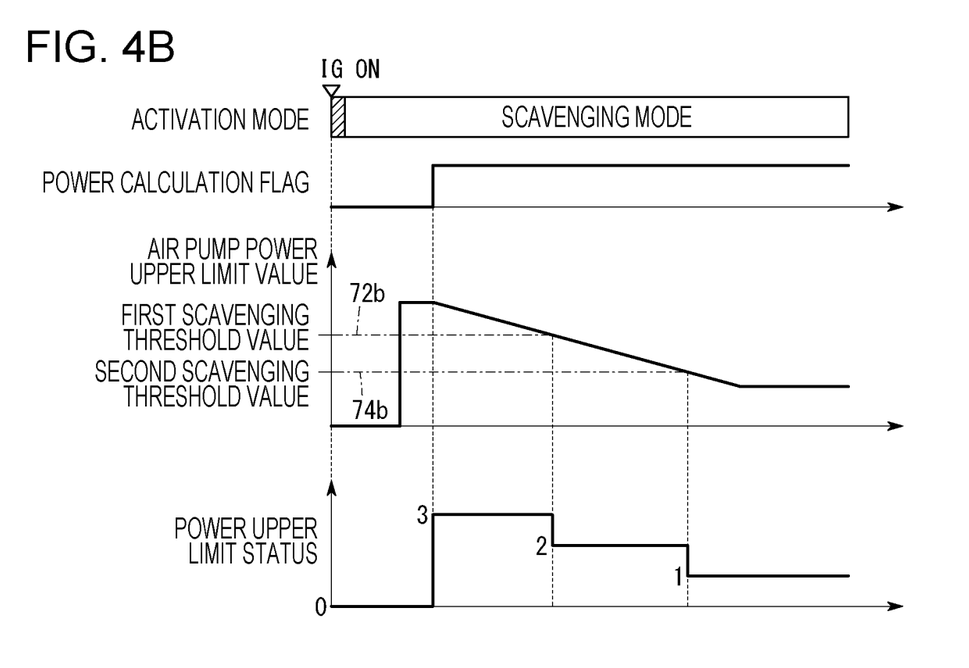
FIG. 4B is a graph illustrating a setting of the power upper limit status in a scavenging mode of the air pump device.

As illustrated in FIGS. 4A and 4B, a plurality of threshold values 70 that the FC_ECU 68 holds are prepared to allocate the air pump power upper limit value APH to the power upper limit status in real time. Namely, the FC_ECU 68 holds a first power generation threshold value 72a and a second power generation threshold value 74a depending on the power generation mode, and a first scavenging threshold value 72b and a second scavenging threshold value 74b depending on the scavenging mode.

The first power generation threshold value 72a and first scavenging threshold value 72b (or collectively referred to as a first threshold value 72. Also, see FIG. 2) indicate boundaries not affecting drive of the air pump device 32 in respective modes when the air pump power upper limit value APH is higher than or equal to the first threshold value 72. The second power generation threshold value 74a and second scavenging threshold value 74b (or collectively referred to as a second threshold value 74. Also, see FIG. 2) are values lower than the first threshold value 72, and indicate boundaries affecting drive of the air pump device 32 in respective modes when the air pump power upper limit value APH is lower than or equal to the second threshold value 74. The second threshold value 74 corresponds to the onboard lower limit value of the SOC as illustrated in FIG. 3. That is, the SOC lower than the onboard lower limit value and the air pump power upper limit value APH lower than the second threshold value 74 have the same meaning.

The FC_ECU 68 assigns the power upper limit status "3" when the air pump power upper limit value APH is higher than or equal to the first threshold value 72; assigns the power upper limit status "2" when the air pump power upper limit value APH is lower than the first threshold value 72 and higher than or equal to the second threshold value 74; and assigns the power upper limit status "1" when the air pump power upper limit value APH is lower than the second threshold value 74.

Figure 5:
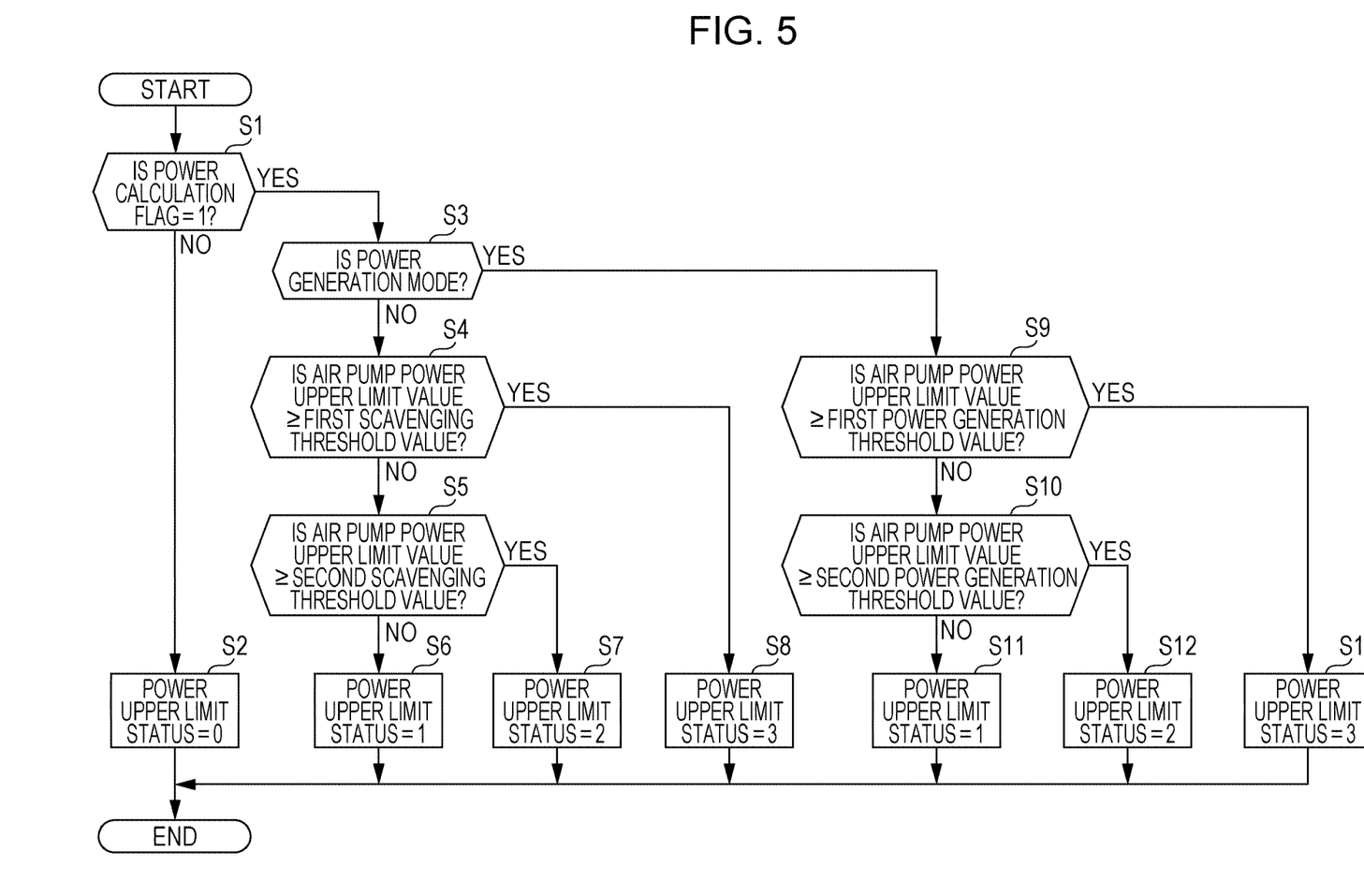
FIG. 5 is a flowchart illustrating a processing flow for setting power status by the control unit.

More specifically, the FC_ECU 68 implements a processing flow like a flowchart illustrated in FIG. 5 to set the power upper limit status of the air pump device 32 based on the present state of the battery 62. In the processing flow, the FC_ECU 68 first determines whether a power calculation flag is 0 or 1 (step S1). The power calculation flag is a register that the FC_ECU 68 holds internally and is used to determine whether to allocate the status when fuel cell system 10 is activated. For example, the power calculation flag is set based on receipt of the air pump power upper limit value APH from the energy management ECU 66.

Then, when the power calculation flag is 0 (step S1: NO), 0 is allocated as the power upper limit status in the step S2, and the processing flow ends. On the other hand, when the power calculation flag is 1 (step S1: YES), the FC_ECU 68 determines in the step S3 whether the fuel cell system 10 implements the power generation mode, or determines the drive state (power generation mode or scavenging mode) of the air pump device 32.

In a case where the power generation mode is not implemented (step S3: NO), the scavenging mode is implemented. In this case, the FC_ECU 68 compares the air pump power upper limit value APH and first scavenging threshold value 72b with each other in the step S4. When the air pump power upper limit value APH is lower than the first scavenging threshold value 72b (step S4: NO), processing proceeds to the step S5. When the air pump power upper limit value APH is higher than or equal to the first scavenging threshold value 72b (step S4: YES), processing proceeds to the step S8.

Further, in the step S5, the FC_ECU 68 compares the air pump power upper limit value APH and second scavenging threshold value 74b with each other. Then, when the air pump power upper limit value APH is lower than the second scavenging threshold value 74b (step S5: NO), processing proceeds to the step S6, and 1 is allocated as the power upper limit status in the step S6. Then, processing ends. On the other hand, when the air pump power upper limit value APH is higher than or equal to the second scavenging threshold value 74b (step S5: YES), processing proceeds to the step S7, and 2 is allocated as the power upper limit status in the step S7. Then, processing ends. In the step S8, 3 is allocated as the power upper limit status, and processing ends.

Meanwhile, when implementing the power generation mode (step S3: YES), the FC_ECU 68 compares the air pump power upper limit value APH and first power generation threshold value 72a with each other in the step S9. Then, when the air pump power upper limit value APH is lower than the first power generation threshold value 72a (step S9: NO), processing proceeds to the step S10. When the air pump power upper limit value APH is higher than or equal to the first power generation threshold value 72a (step S9: YES), processing proceeds to the step S13.

Further, in the step S10, the FC_ECU 68 compares the air pump power upper limit value APH and second power generation threshold value 74a with each other. Then, when the air pump power upper limit value APH is lower than the second power generation threshold value 74a (step S10: NO), processing proceeds to the step S11, and 1 is allocated as the power upper limit status in the step S11. Then, processing ends. On the other hand, when the air pump power upper limit value APH is higher than or equal to the second power generation threshold value 74a (step S10: YES), processing proceeds to the step S12, and 2 is allocated as the power upper limit status in the step S12. Then, processing ends. In the step S13, 3 is allocated as the power upper limit status, and processing ends.

The FC_ECU 68 sets an appropriate power upper limit status according to the air pump power upper limit value APH in the above processing flow. More specifically, the fuel cell system 10 discriminates the power generation request and scavenging request of the fuel cell system 12 from each other, changes the first threshold value 72 and second threshold value 74, and thereby allocates the power upper limit status. Thus, the FC_ECU 68 may determine based on the drive state of the air pump device 32 whether the air pump device 32 is driven or not driven. Further, the fuel cell system 10 may update the power upper limit status by periodically repeating the above processing flow.

Figure 6A:
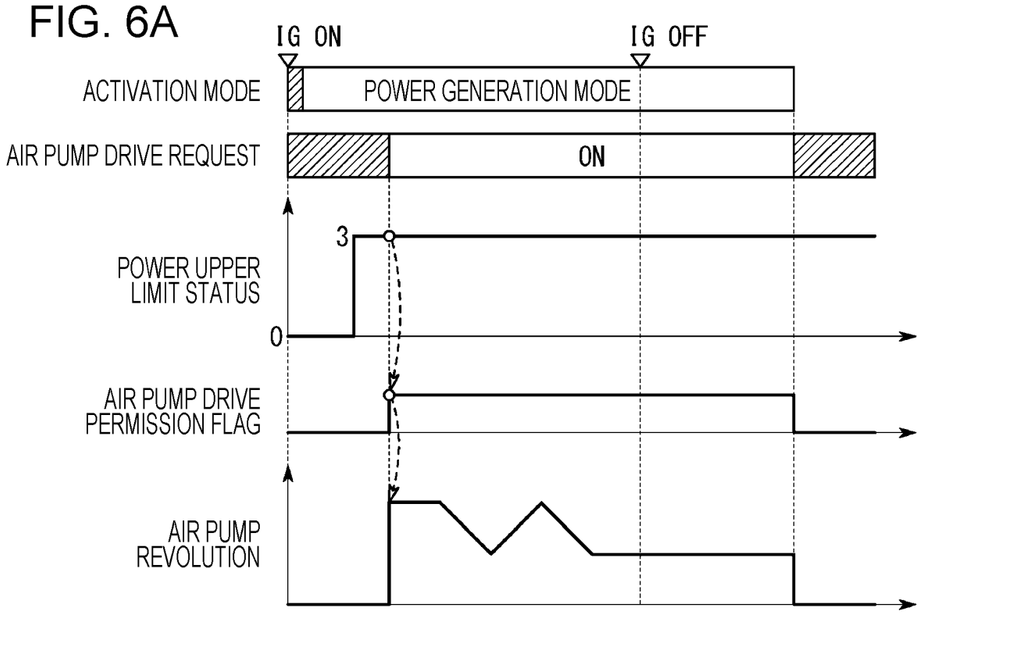
FIG. 6A is a time chart illustrating a processing for causing the air pump device to drive based on the power upper limit status.
Figure 6B:
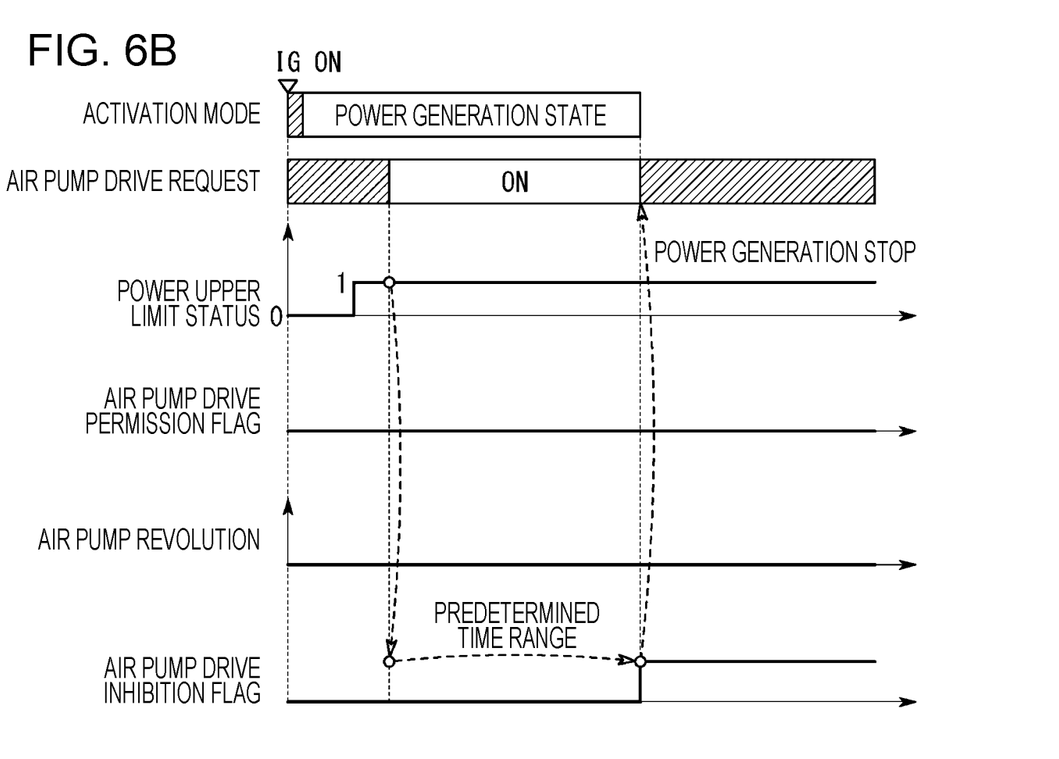
FIG. 6B is a time chart illustrating a processing for not causing the air pump device to drive based on the power upper limit status.

After setting the power upper limit status, the FC_ECU 68 receives an air pump drive request command from the air pump PDU 44 or fuel cell 12 and thereby controls switching to drive or non-drive of the air pump device 32. Specifically, as illustrated in FIG. 6A, when the power upper limit status is 3, an air pump drive permission flag is changed from 0 to 1 upon turn-ON of the air pump drive request. The control unit 18 determines whether the fuel cell vehicle is in the onboard state or in the service state during a period following IGON and ending turn-ON of the air pump drive request, and determines whether the air pump device 32 is in the power generation mode or in the scavenging mode. FIGS. 6A and 6B indicate drive determination of the air pump device 32 in the power generation mode. Although not illustrated, even when the power upper limit status is 2, an air pump drive permission flag is changed from 0 to 1 upon turn-ON of the air pump drive request.

The air pump drive permission flag is a register that the FC_ECU 68 holds internally, and is used to determine the drive state of the air pump device 32. When the air pump drive permission flag becomes 1, the FC_ECU 68 calculates the air pump revolution R from the air pump current command value AIO instructed by the energy management ECU 66 and outputs the calculated air pump revolution R to the air pump PDU 44.

Then, ignition is turned OFF (IGOFF), power generation mode of the fuel cell system 10 ends, and the air pump drive request is turned OFF. When the air pump drive request is turned OFF, the FC_ECU 68 changes the air pump drive permission flag latched in the register from 1 to 0 and stops drive of the air pump device 32 (turns the air pump revolution R to 0).

Meanwhile, as illustrated in FIG. 6B, when the power upper limit status is 1, the air pump drive permission flag is not raised and kept 0 even if the air pump drive request is turned ON. Thus, drive of the air pump device 32 is stopped. When the air pump drive request is turned ON, the FC_ECU 68 starts time measurement in accordance with a timer (not illustrated) and monitors whether the power upper limit status becomes 2 or larger during a predetermined time range.

Then, if the power upper limit status remains 1 during a predetermined time range, the FC_ECU 68 changes the air pump drive inhibition flag from 0 to 1. The air pump drive inhibition flag is a register that the FC_ECU 68 holds internally, and is used to determine the drive stop of the air pump device 32. When the air pump drive inhibition flag is raised, the FC_ECU 68 forcibly turns OFF the air pump drive request and stops power generation by the fuel cell 12. Meanwhile, if the air pump power upper limit value APH becomes 2 or larger during the predetermined time range, the FC_ECU 68 changes the air pump drive permission flag to 1 and thereby causes the air pump to drive.

With the above control, when the air pump power upper limit value APH is low, the control unit 18 may prevent power consumption of the battery 62 involved in drive of the air pump device 32 without forcibly rotating the pump body 42. When the air pump power upper limit value APH is higher than the second threshold value 74 and there is a possibility that the air pump may be activated (when the power upper limit status is 2 or larger), power generation of the fuel cell 12 may be started by driving the air pump device 32.

Further, in a case where drive of the air pump device 32 is failed due to the power limitation status set to 2, the fuel cell system 10 may record that power generation is stopped due to drop of the air pump power upper limit value APH without detecting the failure. Thus, checking of the air pump device 32 in the service state may be eliminated and thereby work efficiency in the service state may be improved. On the other hand, in a case where drive of the air pump device 32 is failed due to the power limitation status set to 3, there is a high possibility that a failure has occurred in the air pump device 32. In this case, the fuel cell system 10 may detect the failure (record the DTC code). Thus, maintenance of the air pump device 32 may be performed intensively.

Figure 7:
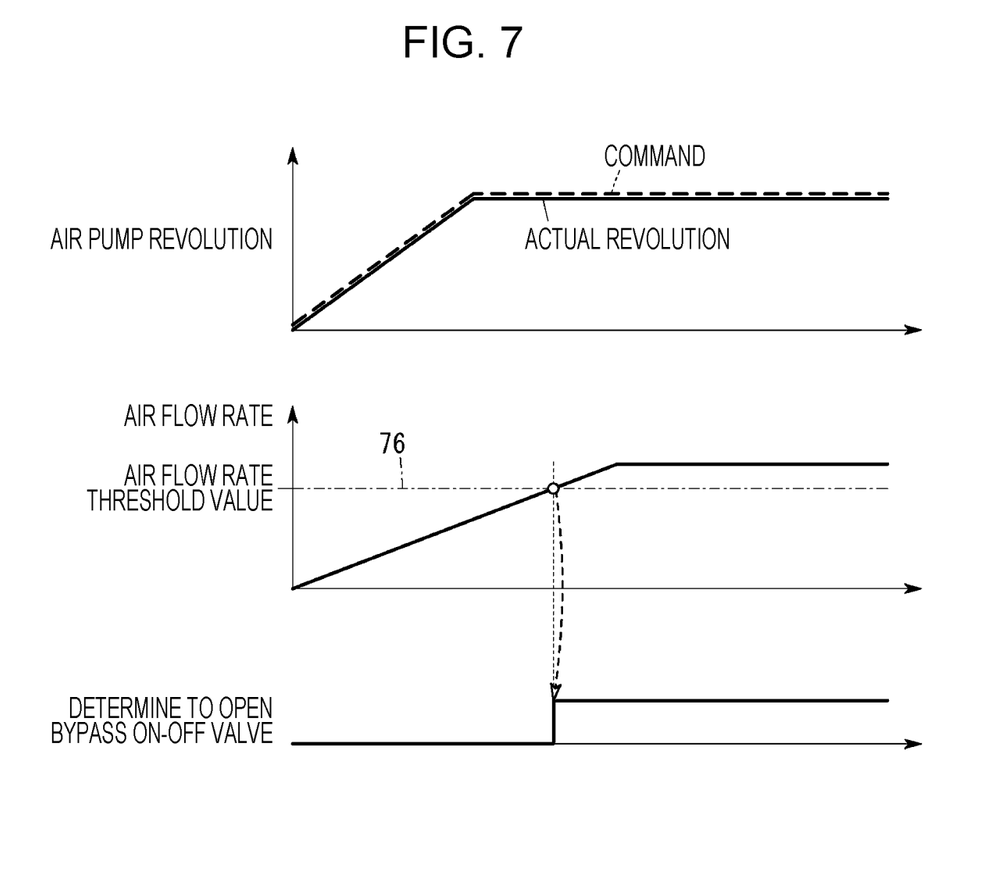
FIG. 7 is a time chart illustrating a state of an air flow rate when the air pump device starts to activate normally.

The control unit 18 is configured to determine whether the air pump device 32 is activated normally, by monitoring the air flow rate of the air pump device 32 after giving drive permission to the air pump device 32. Specifically, in a case where the air pump device 32 is activated normally, the air pump revolution R instructed by the FC_ECU 68 and an actual revolution of the air pump device 32 match each other as illustrated in FIG. 7. For this reason, the FC_ECU 68 detects that an air flow rate detected by a flow meter 80 (see FIG. 1) becomes higher than an air flow rate threshold value 76 held in advance during a predetermined time period counted by the timer. Then, upon determining that the air flow rate by the air pump exceeds the air flow rate threshold value 76, the FC_ECU 68 opens a bypass on-off valve 40 closed by that time, and supplies air to the fuel cell 12.

Figure 8:
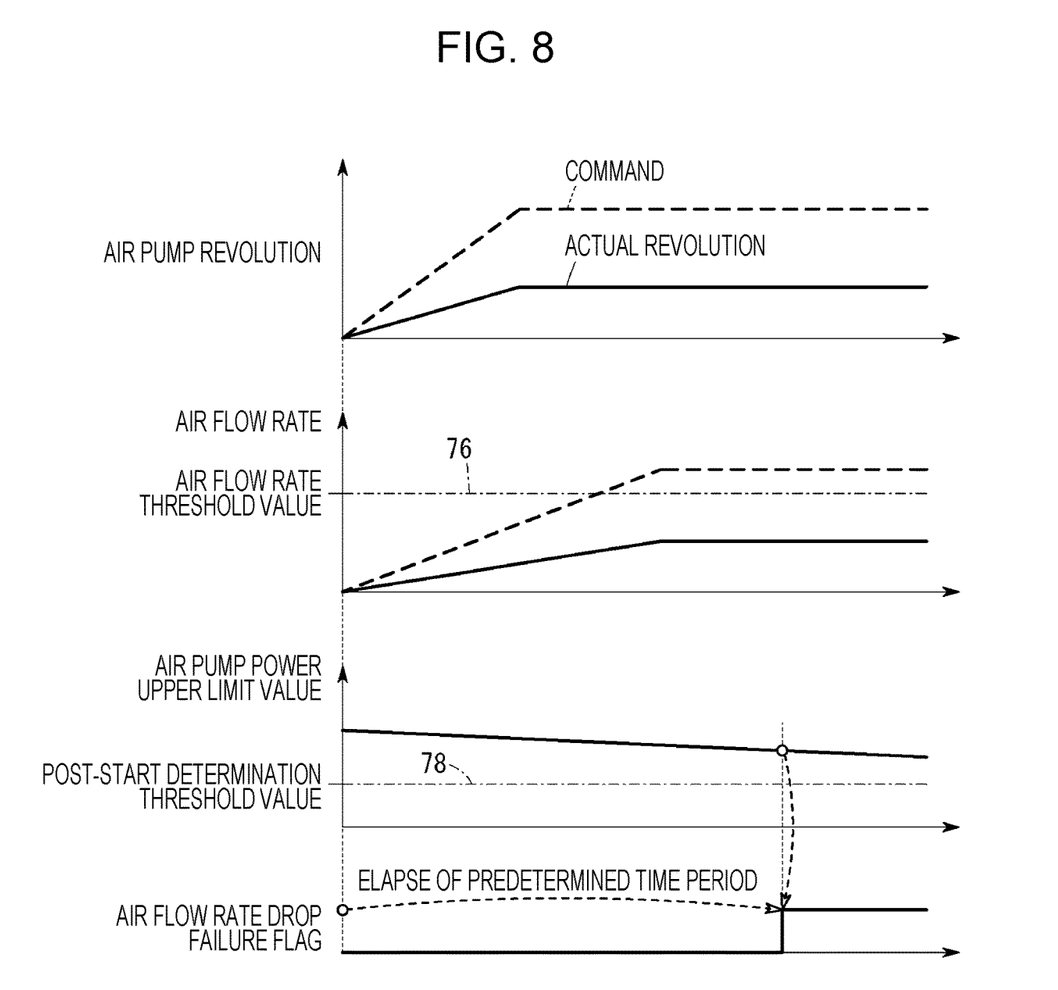
FIG. 8 is a time chart illustrating a state of the air flow rate and an air pump power upper limit value when the air pump device having an air flow rate drop failure starts to activate.
Figure 9:
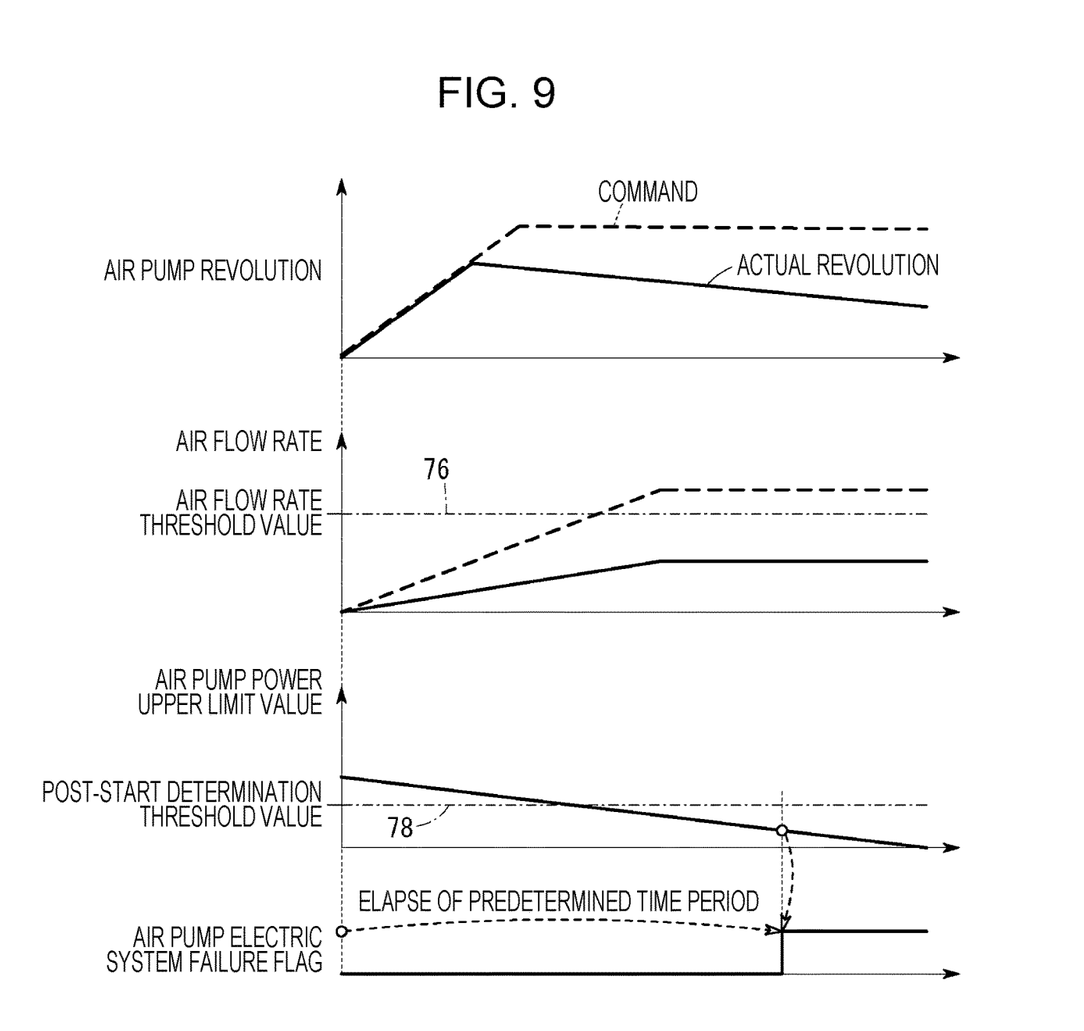
FIG. 9 is a time chart illustrating a state of the air flow rate and the air pump power upper limit value when the air pump device having a low air pump power upper limit value starts to activate.

Meanwhile, in a case where there is a failure with the air pump device 32, an actual revolution of the air pump device 32 may not reach the air pump revolution R instructed by the FC_ECU 68, or the actual revolution may decrease gradually, as illustrated in FIGS. 8 and 9. Thus, the FC_ECU 68 detects that the detected air flow rate does not exceed the air flow rate threshold value 76 during a predetermined time period.

In this case, the FC_ECU 68 identifies the failure detail of the air pump device 32 based on the air pump power upper limit value APH transmitted from the energy management ECU 66. Specifically, the FC_ECU 68 determines whether an acquired air pump power upper limit value APH is lower than a post-start determination threshold value 78 (for example, a value matching the second power generation threshold value 74a for the power generation mode, or the second scavenging threshold value 74b for the scavenging mode).

As illustrated in FIG. 8, when the air pump power upper limit value APH is higher than or equal to the post-start determination threshold value 78, it may be considered that there is no problems with the power supplied to the air pump device 32 by the battery 62. A failure of this case may be caused by insufficient revolution due to a failure of the pump body 42 or air pump PDU 44 or by a pressure loss in the air supply passage 30. For this reason, the FC_ECU 68 identifies the failure (DTC code) called "air flow rate drop failure" by estimating that a problem has occurred in the oxidant gas supply device 14. The DTC code of "air flow rate drop failure" is stored in a memory of the FC_ECU 68 and notified to other ECUs. Further, the FC_ECU 68 may implement power generation stop of the fuel cell system 10 and notify the failure based on the DTC code via a notification device (such as touch panel, indicator and speaker).

On the other hand, as illustrated in FIG. 9, in a case where the air pump power upper limit value APH is lower than the post-start determination threshold value 78, it may be considered that there is a problem with the power supplied to the air pump device 32 by the battery 62. More specifically, there is a possibility that the failure has occurred due to low air pump power upper limit value APH. In this case, the FC_ECU 68 identifies the failure (DTC code) called "air pump power upper limit value" as a power supply failure, and stores in the memory and notifies to other ECUs. In the same manner as the "air flow rate drop failure", the FC_ECU 68 may implement power generation stop of the fuel cell system 10 and notify the failure based on the DTC code via a notification device (such as touch panel, indicator and speaker). Alternatively, in a case where the air pump power upper limit value APH is low, the FC_ECU 68 may store to the effect that power generation is stopped due to power drop, without detecting as a failure.

As described above, the fuel cell system 10 according to the present embodiment may favorably switch drive or non-drive of the air pump device 32 based on the air pump power upper limit value APH obtained from information (discharge limit D) related to the amount of power of the battery device 16. More specifically, when the air pump power upper limit value APH is higher than or equal to the second threshold value 74, activation of the fuel cell system 10 may be tried by driving the air pump device 32 with the battery 62 having the remaining charge amount. Thus, power may be generated by the fuel cell 12 and thereby power may be supplied to the battery 62 and loads. On the other hand, when the air pump power upper limit value APH is lower than the second threshold value 74, power drop of the battery 62 may be suppressed by not driving the air pump device 32. As a result, unnecessary battery replacement may be suppressed.

By using the air pump power upper limit value APH, the fuel cell system 10 may precisely determine drive or non-drive of the air pump device 32 based on the upper limit of the power supplied to the air pump device 32 while eliminating factors (noise) such as power distribution to other auxiliaries. Further, the control unit 18 may simply calculate the air pump power upper limit value APH by acquiring the discharge limit D of the battery 62.

Further, the fuel cell system 10 may set control of the air pump device 32 in more detail by determining the air pump power upper limit value APH with the first threshold value 72 and second threshold value 74. For example, in a case where the air pump power upper limit value APH is higher than or equal to the first threshold value 72 and drive of the air pump device 32 is failed, there is a possibility that a failure has occurred in the air pump device 32 itself. Thus, by detecting the possibility, maintenance works may be performed in an efficient manner. Meanwhile, in a case where the air pump power upper limit value APH is lower than the first threshold value 72 and higher than or equal to the second threshold value 74, and drive of the air pump device 32 is failed, the fuel cell system 10 may recognize by detecting power limitation that there is a possibility that the air pump device 32 is not driven due to power limitation.

It is needless to say that the present disclosure is not limited to the embodiments described above, but various modifications are available within a scope not deviating from the subject matter of the present disclosure. For example, in the present embodiment, the control unit 18 is configured to acquire the discharge limit D as information related to the amount of power from the battery device 16, calculate the air pump power upper limit value APH, and compare the air pump power upper limit value APH and the threshold value 70 with each other. However, when activating the fuel cell vehicle in the onboard state, the control unit 18 may be configured to acquire the SOC of the battery 62 and compare the SOC and an onboard lower limit value held in advance with each other (see FIG. 3).

In this case, when the SOC is higher than or equal to the onboard lower limit value, the air pump device 32 is driven with power supplied from the battery device 16 to the air pump device 32. On the other hand, when the SOC is lower than the onboard lower limit value, drive of the air pump device 32 is stopped by shutting down power supply from the battery device 16 to the air pump device 32. Thus, when the SOC is lower than the onboard lower limit value, power drop of the battery 62 is suppressed and thereby power in the service state may be secured.

The present application describes a fuel cell system including a fuel cell, a battery device, an air pump device configured to start driving with power supplied from the battery device to supply air to the fuel cell, and a control unit configured to control the drive of the air pump device based on information related to an amount of power acquired from the battery device. Here, at the time of activation, the control unit compares an acquired value obtained from the information related to an amount of power and at least one threshold value held by the control unit with each other, causes the air pump device to drive when the acquired value is higher than or equal to the threshold value, and does not cause the air pump device to drive when the acquired value is lower than the threshold value.

According to the above, the fuel cell system may favorably switch drive or non-drive of the air pump device based on an acquired value obtained from information related to the amount of power of the battery device. More specifically, when the acquired value is higher than or equal to a threshold value, activation of the fuel cell system may be tried by driving the air pump device with the battery having the remaining charge amount. Thus, power may be generated by the fuel cell and thereby power may be supplied to the battery and loads. On the other hand, when the acquired value is lower than the threshold value, the fuel cell system may suppress power drop of the battery without driving the air pump device. As a result, unnecessary battery replacement may be suppressed.

In this case, the control unit preferably calculates an air pump power upper limit value as the acquired value, the air pump power upper limit value being an upper limit of power supplied to the air pump device.

Thus, by calculating the air pump power upper limit value, the control unit may precisely determine drive or non-drive of the air pump device based on the upper limit of the power supplied to the air pump device while eliminating factors (noise) such as power distribution to other auxiliaries.

In addition to configuration described above, the control unit may calculate the air pump power upper limit value based on a discharge limit that is set based on an amount of power of the battery device and that is an upper limit of power outputted by the battery.

Thus, the control unit may simply derive (acquire) the acquired value by calculating an air pump power upper limit value based on a discharge limit.

The threshold value includes a first threshold value and a second threshold value that is lower than the first threshold value, and in which the control unit may causes the air pump device to drive when the air pump power upper limit value is higher than or equal to the second threshold value, and does not have to cause the air pump device to drive when the air pump power upper limit value is lower than the second threshold value.

Thus, the fuel cell system may set control of the air pump device in more detail by using a first threshold value and a second threshold value for the air pump power upper limit value.

Specifically, the control unit can detect failure of the air pump device when the air pump power upper limit value is higher than or equal to the first threshold value and drive of the air pump device is failed, and detect that power is limited when the air pump power upper limit value is lower than the first threshold value and higher than or equal to the second threshold value, and drive of the air pump device is failed.

Thus, in a case where the air pump power upper limit value is higher than or equal to the first threshold value, and drive of the air pump device is failed, there is a possibility that a failure has occurred in the air pump device itself. Thus, by detecting the possibility, maintenance works may be performed in an efficient manner. Meanwhile, in a case where the air pump power upper limit value is lower than the first threshold value and higher than or equal to the second threshold value, and drive of the air pump device is failed, the fuel cell system may recognize by detecting power limitation that there is a possibility that the air pump device is not driven due to power limitation.

After activation of the air pump device starts, the control unit may detect air flow rate of the air pump device, when the air flow rate is not higher than an air flow rate threshold value after elapse of a predetermined time, may determine whether the air pump power upper limit value as of that time is higher than the threshold value, and when the air pump power upper limit value is higher than the threshold value, may detect failure of the air pump device.

Thus, even after the air pump device starts to activate, a failure of the air pump device may be detected by monitoring a change in the air flow rate and air pump power upper limit value.

The control unit may acquires or calculates SOC indicating a remaining charge amount of the battery device as information related to the amount of power, may have an SOC lower limit value corresponding to the SOC as the threshold value, may cause the air pump device to drive when the SOC is higher than or equal to the SOC lower limit value, and does not have to cause the air pump device to drive when the SOC is lower than the SOC lower limit value.

Thus, drive or non-drive of the air pump device may be simply determined by comparing the battery's SOC and SOC lower limit value with each other.

The control unit preferably determines whether drive state of the air pump device is based on power generation request of a fuel cell or scavenging request of the fuel cell and changes the threshold value depending on the power generation request or the scavenging request.

Thus, the threshold value is changed by discriminating power generation request and scavenging request of the fuel cell from each other, and thereby drive or non-drive of the air pump device may be determined based on the drive state of the air pump device.

According to the present disclosure, the fuel cell system may suppress power drop of the battery and unnecessary battery replacement by switching drive or non-drive of the air pump device based on the state of the battery.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
    a fuel cell;
    a battery device;
    an air pump device configured to start driving with power supplied from the battery device to supply air to the fuel cell; and
    a control unit programmed to control the drive of the air pump device based on information related to an amount of power acquired from the battery device,
    wherein at the time of activation, the control unit is programmed to:
        compare an acquired value obtained from the information related to the amount of power and threshold values held by the control unit with each other, the threshold values including a first threshold value and a second threshold value that is lower than the first threshold value;
        cause the air pump device to drive when the acquired value is higher than or equal to the second threshold value; and
        not cause the air pump device to drive when the acquired value is lower than the second threshold value,
    wherein the control unit is programmed to calculate an air pump power upper limit value as the acquired value, the air pump power upper limit value being an upper limit of power supplied to the air pump device, and
    wherein the control unit is programmed to:

detect failure of the air pump device when the air pump power upper limit value is higher than or equal to the first threshold value and drive of the air pump device is failed; and detect that power is limited when the air pump power upper limit value is lower than the first threshold value and higher than or equal to the second threshold value, and drive of the air pump device is failed.

2. The fuel cell system according to claim 1,
wherein the control unit is programmed to calculate the air pump power upper limit value based on a discharge limit that is set based on an amount of power of the battery device and that is an upper limit of power outputted by the battery.

3. The fuel cell system according to claim 1,
wherein the control unit is programmed to:
after activation of the air pump device starts, detect air flow rate of the air pump device;
when the air flow rate is not higher than an air flow rate threshold value after elapse of a predetermined time, determine whether the air pump power upper limit value as of that time is higher than the second threshold value; and
when the air pump power upper limit value is higher than the second threshold value, detect failure of the air pump device.

4. The fuel cell system according to claim 1,
wherein the control unit is programmed to:
acquire or calculate SOC indicating a remaining charge amount of the battery device as information related to the amount of power;
have an SOC lower limit value corresponding to the SOC as the second threshold value;
cause the air pump device to drive when the SOC is higher than or equal to the SOC lower limit value; and
not cause the air pump device to drive when the SOC is lower than the SOC lower limit value.

5. The fuel cell system according to claim 1,
wherein the control unit is configured to determine whether drive state of the air pump device is based on power generation request of a fuel cell or scavenging request of the fuel cell and change the second threshold value depending on the power generation request or the scavenging request.

6. A fuel cell system comprising:
a battery to store electric power;
a fuel cell to supply electric power to the battery;
an air pump to be driven with the electric power supplied from the battery to supply air to the fuel cell; and
a processor, when starting the fuel cell system, programmed to:
compare an amount of the electric power stored in the battery with a first threshold value and a second threshold value that is lower than the first threshold value;
drive the air pump when the amount of the electric power is higher than or equal to the second threshold value; and
prohibit driving of the air pump when the amount of the electric power is lower than the second threshold value,
wherein the processor is programmed to calculate an air pump power upper limit value as the amount of the electric power, the air pump power upper limit value being an upper limit of power supplied to the air pump, and wherein the processor is programmed to:
detect failure of the air pump when the air pump power upper limit value is higher than or equal to the first threshold value and when drive of the air pump is failed; and
detect that power is limited when the air pump power upper limit value is lower than the first threshold value and higher than or equal to the second threshold value, and when drive of the air pump is failed.

7. The fuel cell system according to claim 6,
wherein the processor, when starting the fuel cell system, is programmed to compare an acquired value indicating the amount of the electric power with the first threshold value and the second threshold value.

8. The fuel cell system according to claim 6,
wherein the processor is programmed to calculate the air pump power upper limit value based on a discharge limit that is set based on the amount of the electric power stored in the battery and that is an upper limit of the electric power output from the battery.

9. The fuel cell system according to claim 6,
wherein the processor is programmed to:
detect air flow rate of the air pump after activation of the air pump starts;
when the air flow rate is not higher than an air flow rate threshold value after elapse of a predetermined time, determine whether the air pump power upper limit value as of that time is higher than the second threshold value; and
detect failure of the air pump if the air pump power upper limit value is higher than the second threshold value.

10. The fuel cell system according to claim 7,
wherein the processor is programmed to:
acquire or calculate SOC indicating a remaining charge amount of the battery as information related to the amount of the electric power;
have an SOC lower limit value corresponding to the SOC as the second threshold value;
drive the air pump if the SOC is higher than or equal to the SOC lower limit value; and
prohibit to drive the air pump if the SOC is lower than the SOC lower limit value.

11. The fuel cell system according to claim 7,
wherein the processor is programmed to determine whether drive state of the air pump is based on power generation request of a fuel cell or scavenging request of the fuel cell and programmed to change the second threshold value depending on the power generation request or the scavenging request.

12. The fuel cell system according to claim 1, further comprising:
a humidifier,
wherein the control unit is programmed to start driving the air pump device with power supplied from the battery device to supply air through the humidifier to the fuel cell.

13. The fuel cell system according to claim 6, further comprising:
a humidifier,
wherein the processor is programmed to start driving the air pump with power supplied from the battery to supply air through the humidifier to the fuel cell.

* * * * *